J. H. SNIVELY.
MOUNT FOR PHOTOGRAPHIC FILMS.
APPLICATION FILED SEPT. 28, 1918.
1,317,946.
Patented Oct. 7, 1919.
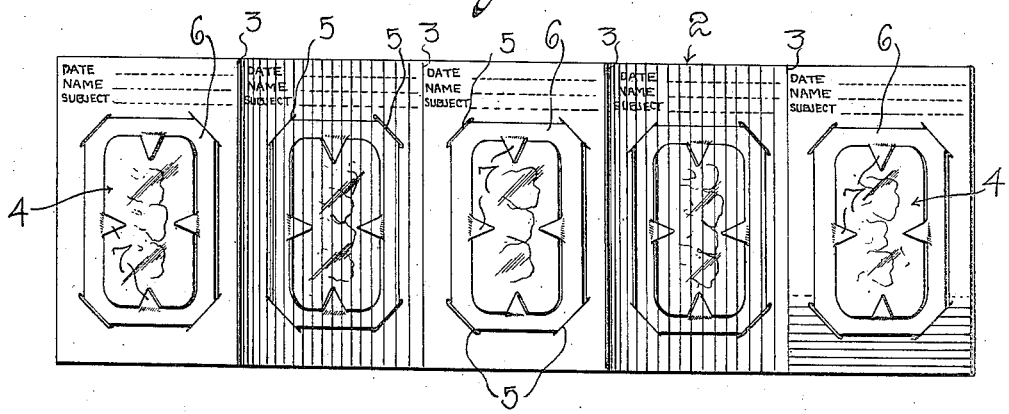
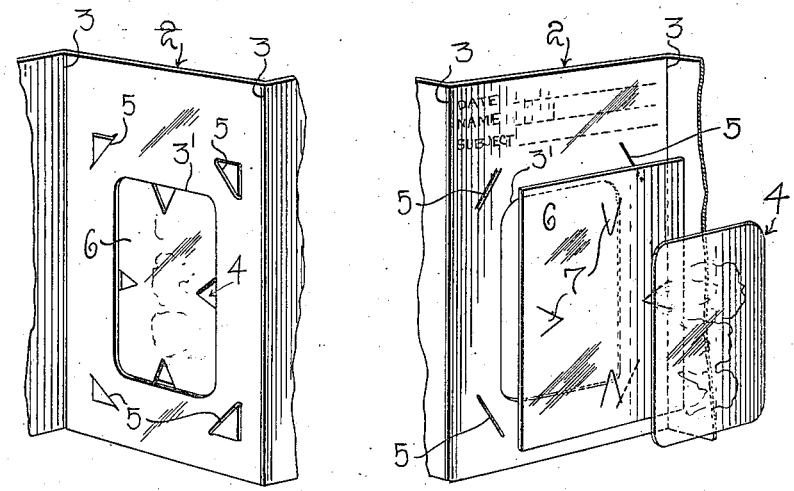

UNITED STATES PATENT OFFICE.

JACOB HOWARD SNIVELY, OF SEATTLE, WASHINGTON.

MOUNT FOR PHOTOGRAPHIC FILMS.

1,317,946.  Specification of Letters Patent.  Patented Oct. 7, 1919.

Application filed September 28, 1918. Serial No. 256,023.

*To all whom it may concern:*

Be it known that I, JACOB H. SNIVELY, a citizen of the United States, residing at Seattle, in the county of King and State of Washington, have invented certain new and useful Improvements in Mounts for Photographic Films; and I do hereby declare the following to be a full, clear, and exact description of the invention, such as will enable others skilled in the art to which it appertains to make and use the same.

This invention relates to a device for mounting and preserving various desired bodies and particularly to mounting and packing photographic films, and especially Rontgenographic dental films.

It is one of the objects of the present invention to provide for the secure preservation and packing arrangement of photographic films or in fact other appropriate devices, and an important object of the present invention is to provide a mount of such construction that a Rontgenographic dental film will be so arranged and disposed that it may be viewed when presented to a source of light with the maximum efficiency in the presentation of the photographic impression and it is an especial object of the invention to provide a mount of such construction that there will be substantially a total absence of obstruction to the transmitted light before it reaches and passes through the photographic film to the eye of the observer. In other words, it is an object of the invention to provide for the maximum efficiency of disclosure of the details of the picture on the film.

Another object of the invention is to provide for secure attachment of the film to the mount and also to provide for the ready connection or attachment and detachment when desired, and again, it is an object to provide for the compact arrangement and storing of one or any number of films so that all of the films relating to a given patient or subject can be permanently connected or collected for convenience and also to provide a mount upon which an ample area is provided for the making of the necessary record or data as is necessary or desirable.

It is an important object of the invention to provide a photographic film mount of such design and construction that substantially the entire area in plan of the film may be viewed through an otherwise unobstructed window opening, so that substantially no portion of the film is rendered invisible when it is placed in position for observation. With the above and other objects in view as will become apparent to those versed in the art, the invention consists of the construction, the combination, and in details and arrangements of the parts as more particularly hereinafter described in relation to the embodiment of the invention illustrated in the accompanying drawings in which:

Figure 1 is a perspective view of a series of foldably connected panels, each forming a mount for a photograph;

Fig. 2 is a perspective view of one of the panels viewed from the side opposite to that shown in Fig. 1; and Fig. 3 is a perspective view showing a mount with the panel separated from its pane and showing a film adapted to be attached to the pane.

The preferred form of the invention embodies a mount comprising a panel 2, any number of which may be foldably connected along vertical fold lines 3, formed by scoring, perforating or otherwise providing for connection between a series of the panels 2 for the obvious purpose of securing the preservation and constant grouping of a given series of the films, such for instance, as may be related to a particular subject or patient under treatment. These series of panels 2 may be folded together by collapsing the strip, in alternate bends as clearly illustrated in Fig. 1, so that the whole series may be very compactly stored in a suitable receptacle. Each panel which manifestly may be of any suitable size according to the size of the body or film which it may be desired to mount, is provided with a window opening 3 preferably of a size equal to the plan of the photographic film illustrated in Figs. 3 at 4. The window in this case is shown as approximately oblong in form and adjacent to the corners in the oblong there are made diagonal slits 5 into which the corners of a rectangular pane 6 can be readily inserted, so that the pane is secured to the panel 2 in suitable relation to the window 3, and therefore holds one of the films 4 in coincidence with the window.

While the film 4 may be held in position with relation to the window by any suitable simple and appropriate means, this is accomplished effectively and most inexpensively simply by forming in the pane 3, which is preferably made of transparent material, a series of tongues 7 pointed inwardly and formed by connecting the stock of which the pane is made with V-shaped incisions at suitable locations. These tongues when pressed upwardly from the plane of the pane readily bring over the interposed edge of the film to be exhibited and preserved and firmly hold the pane in proper registration with the opening. In assembling a film in position upon a pane, the side of the film provided with the emulsion is placed next to the pane and is therefore protected by the latter against abrasion during the use of the device.

From the above it will be seen that the present mount is so designed and constructed that a beam of light passing through the window is substantially unobstructed by the interposition of any opaque or translucent element and therefore the maximum intensity of the impression can be observed when the mount is held to the light so that the beam passes through the film. Again, by forming a window in the panel of substantially equal size to the film, this leaves the entire area of the film to be viewed by the person in the use of the device.

An important feature of my mount is that they are made in strips containing the maximum number that would be used for any one patient. Each panel is complete in itself, so that one panel may be clipped off for a patient with two films and these two panels folded so as to be the same size as the patient with one film, or six panels clipped off for the patient with six films and again folded to the same size as a one panel mount. Ten films is about the maximum used for one patient, as all the teeth in one mouth can be gotten with ten, consequently the mounts would be made in strips of ten windows and it would be necessary to carry only this one size in stock, as any number of films under ten could be mounted by simply clipping off what was wanted, and folding to a uniform and convenient size, no matter what the number.

What I claim is:

1. A mount comprising a series of foldably related and connected panels of substantially equal area, having each a window with a detachable transparent pane provided with means for carrying a film body and disposing it in juxtaposition to the window, said window being of the same shape and size as film to be mounted, whereby the entire series of a group of Rontgenographic pictures may be kept assembled compactly and readily severally examined by transmitted light.

2. On a mount for photographic films, a panel having a window substantially equal in area to the plan area of the film to be mounted, a transparent carrier, and means for attaching the film to the carrier, by which latter it is held in register with the window.

3. In a mount for photographic films a panel having an opening therethrough of the same shape and area as the film to be mounted, a transparent carrier, slots formed in said panel adapted to receive portions of the transparent carrier, and tabs struck out from the body of said carrier adapted to receive the film and position it to register with said opening.

In testimony whereof I affix my signature.

JACOB HOWARD SNIVELY.